Nov. 12, 1957  C. G. CONGER  2,812,581
WIDTH GAUGE FOR VEHICLE WHEEL RIMS
Filed Nov. 20, 1953  3 Sheets-Sheet 2
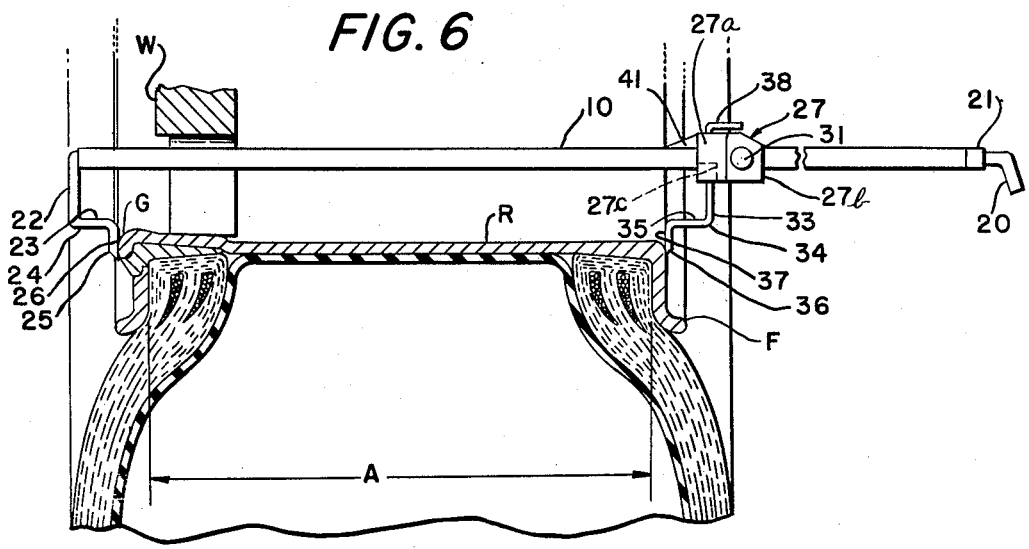
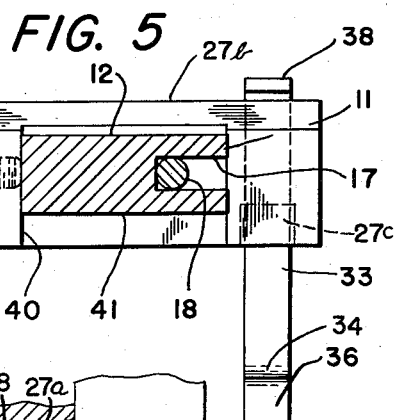
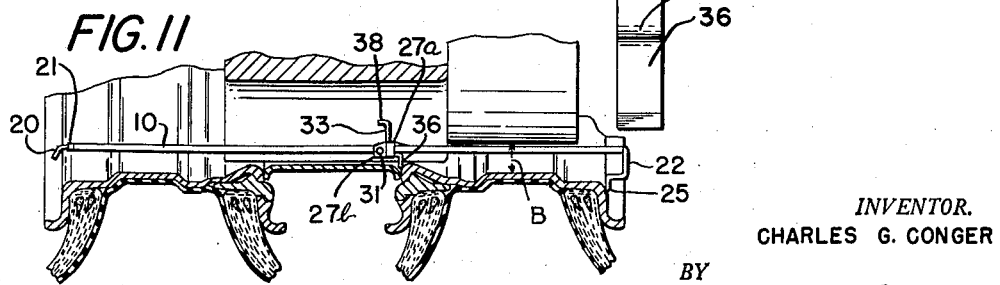
INVENTOR.
CHARLES G. CONGER
BY
William Cleland
ATTORNEY

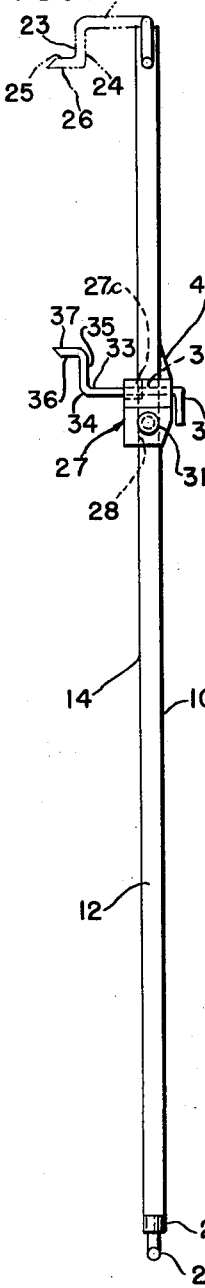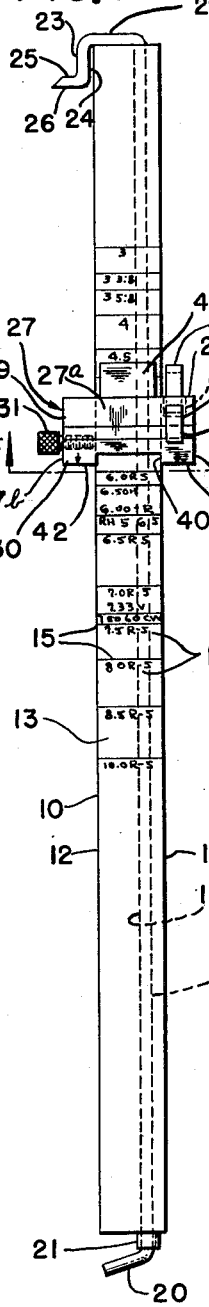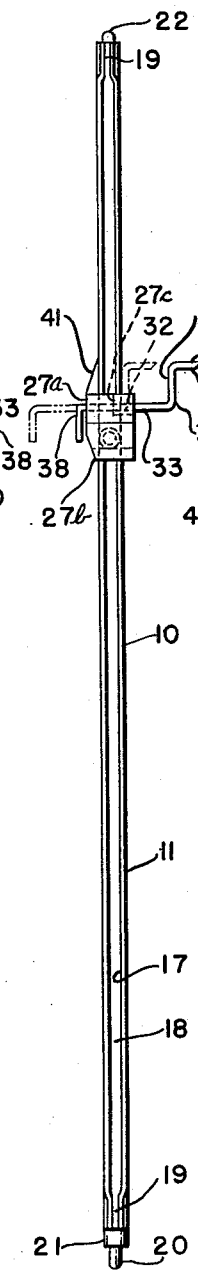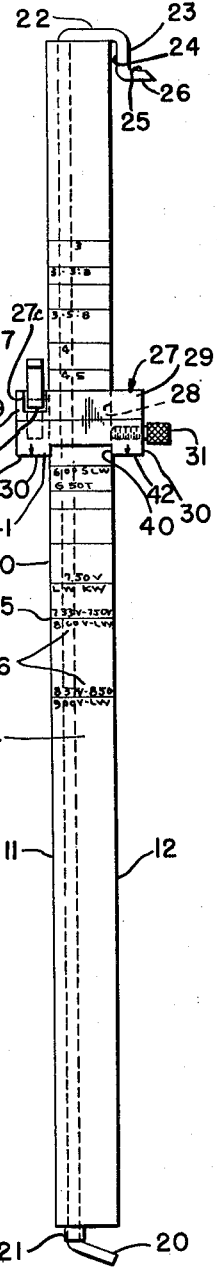

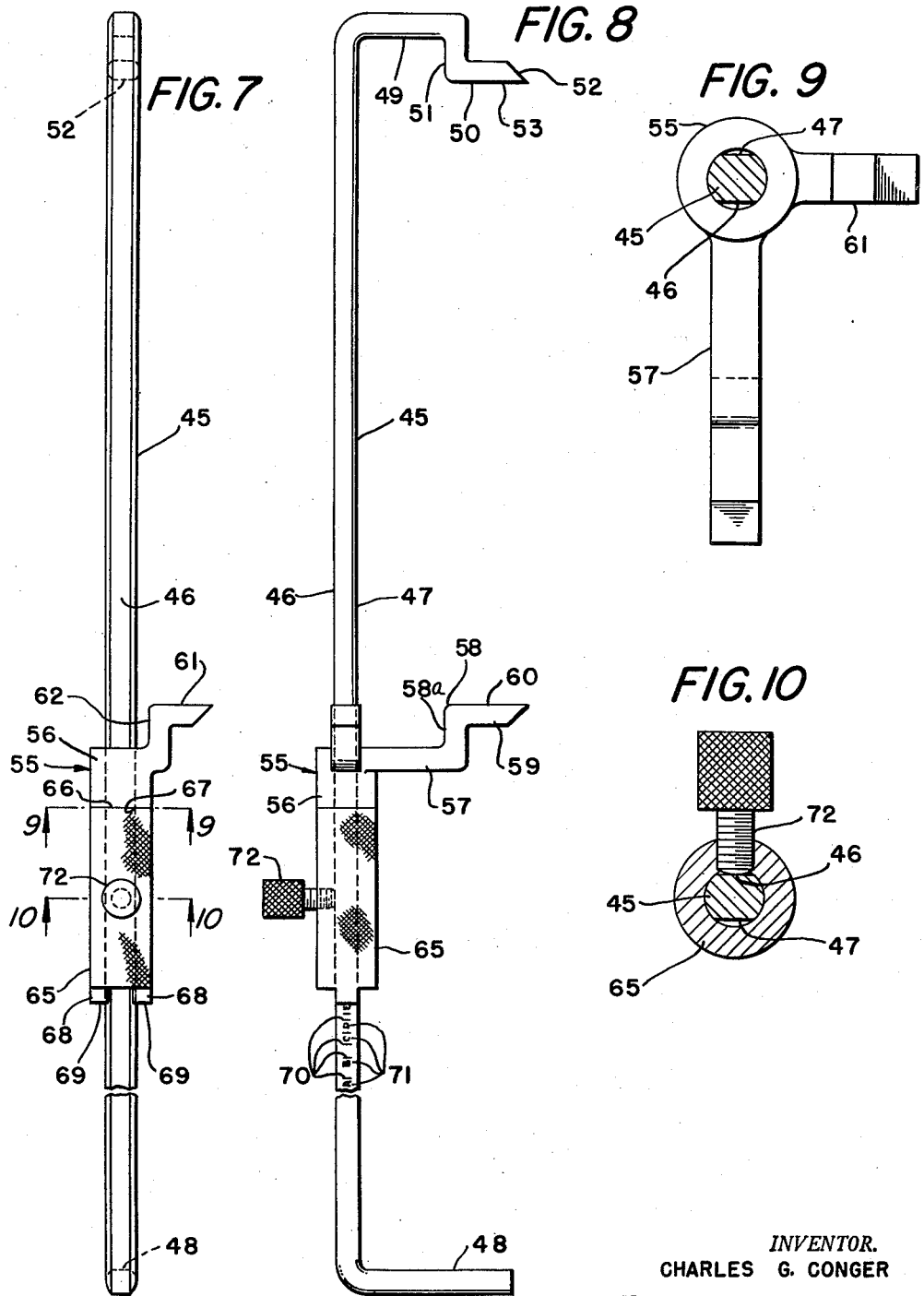

United States Patent Office 2,812,581
Patented Nov. 12, 1957

2,812,581
WIDTH GAUGE FOR VEHICLE WHEEL RIMS
Charles G. Conger, Atlanta, Ga.
Application November 20, 1953, Serial No. 393,300
4 Claims. (Cl. 33—143)

This invention relates to a gauge for measuring the width of a vehicle wheel rim, and in particular to a gauge for measuring the inside widths of such rims while the same have pneumatic tires mounted thereon.

This application is a continuation in part of application Serial No. 224,705, filed on May 5, 1951, now Patent No. 2,774,144.

In the tire industry it is often necessary or desirable to find out the exact inside measurement of a tire rim while the wheel assembly including the tire is still mounted on a truck, for example. This is usually for the purpose of determining the exact size of a replacement tire required for a particular type and size of rim, because the use of oversized or undersized tires on the rims may result in undue chafing, flexing, or abnormal stresses which cause tire failure or lessen the normal life expectancy of the tire. Gauges now on the market for this purpose have either been unreliable or limited as to use thereof, or have involved a certain amount of guesswork, all of which reduced or obviated the possibility of obtaining accurate results.

One object of the present invention is to provide a rim gauge of the character described by which the inside dimension between opposite bead flanges may be accurately determined by gauging between opposite rim portions in accordance with standards esetablished by the wheel and rim industry, without necessarily removing the tire from the rim.

Another object of the invention is to provide a gauge of the character described which may be readily passed through a relatively narrow space inwardly of the rims, such as the spaces between rims and brake drums of wheel assemblies.

Another object of the invention is to provide a gauge of the character described which requires a minimum of skill to use properly and yet which is simple and economical to manufacture.

Another object of the invention is to provide a wheel rim gauge wherein readily adjustable gauging elements are engageable with oppositely disposed rim portions with a minimum of intereference with protrusions on the rim, whereby the gauge adapts itself to use on a very wide variety of types and shapes of rims.

Still another object of the invention is to provide a wheel rim gauge particularly adaptable for use in close quarters and which is adjustable for ready removal from a wheel and rim assembly after a gauging operation, and including improved means for retaining an accurate indication of the gauging results.

Other objects of the invention will be manifest from the following brief descriptions and the accompanying drawings.

Of the accompanying drawings:

Figure 1 is an edge view of a rim gauge embodying the features of the invention.

Figure 2 is a side elevation thereof, as viewed from the right of Figure 1.

Figure 3 is an opposite edge view of the gauge, partly broken away, as viewed from the right of Figure 2.

Figure 4 is a side elevation opposite to that shown in Figure 2, partly broken away, and as viewed from the right of Figure 3.

Figure 5 is an enlarged cross-section taken substantially on the line 5—5 of Figure 2.

Figure 6 is a fragmentary cross-section through a wheel and rim assembly, illustrating use of the gauge for measuring a rim.

Figure 7 is an edge view of a modified form of rim gauge embodying the features of the invention.

Figure 8 is a side elevation of Figure 7, as viewed from the right thereof.

Figures 9 and 10 are enlarged cross-sections taken substantially on the lines 9—9 and 10—10, respectively, of Figure 7.

Figure 11 is a view similar to Figure 6, illustrating use of the gauge of Figures 1 to 5 on a dual wheel.

Referring particularly to Figures 1 to 6 of the drawings the numeral 10 designates an elongated, relatively thin bar of rigid material, such as steel, aluminum, hard plastic, etc., the bar being rectangular in cross-section to define parallel opposite side edges 11 and 12, and parallel flat top and bottom faces 13 and 14. Scored on the flat faces 13 and 14 may be varyingly spaced indicia including lines 15 and corresponding data 16 indicating the rim dimensions of various makes, types and sizes of rims, in a manner to be described later.

Along the straight side edge 11 of bar 10 may be a groove 17 within which an elongated rod 18 is rotatably retained as by crimping 19, 19 at opposite ends of the bar. The rod may be firmly retained against longitudinal movement of the same in the groove 17, as by means of a collar 21 received on the rod and engaging between one end of the bar and an angularly outturned handle extension 20 of the rod, and a gauging finger 22 outturned from the opposite end of the rod engaging the correspondingly opposite end of the bar.

The finger 22, which is of width approximating the thickness of bar 10, as best seen in Figures 1 and 3, terminates in a freely extending reversely bent portion 23 defining a shoulder 24 transversely outwardly offset from the bar 10 in all positions thereof, and a relatively short gauging tip 25 which is longitudinally inwardly offset with respect to the corresponding end of bar 10. A flat inner face 26 of said tip lies in a plane which is at right angles to the general plane of the bar. By means of handle 20 the rod 18 may be turned to swing the finger 22 from the retracted position shown in full lines in Figures 1 to 4 to the gauging position shown in chain-dotted lines in Figure 1.

A slide block or head 27 has a rectangular opening 28 therethrough for sliding reception of the flat bar 10. Block 27 may comprise two longitudinally separable parts including a gauging member 27a and an indexing member 27b, these members having solid extensions 29, 29 and 30, 30, respectively, laterally outwardly of the side edges of the bar. Provided laterally inwardly through one extension 30 of indexing member 27b is a set screw 31, which is engageable at its inner end with the flat side edge 21 of bar 10 to lock the member 27b in various positions of longitudinal adjustment thereon. Slidably received through a rectangular opening 32 in an extension 29 of the gauging member 27a, at the side of the gauge opposite to edge 12, may be a gauging finger 33 of corresponding cross-section, said finger terminating in a freely extending reversely bent portion 34 defining a shoulder 35, outwardly offset from one flat side 14 of the bar, and a relatively short gauging tip 36 which is longitudinally offset in direction toward the finger 22. Thus, in the operating position of the tool shown in full and chain-dotted lines in Figure 1 the fingers 22 and 33 are oppositely inwardly offset, for gauging purposes to be described later. The face 37 of tip 36 is flat and in parallelism to the face 26 of the tip 25 (Figure 1). Finger 33 is bent to provide a stop lug 38 on the end thereof opposite the reversely bent portion 34, to prevent removal of the finger from the block 27a. Cut-out portions 40 in the member 27b provide straight edge portions to facilitate reading the rim data 16 on both sides of the indexing lines 15, and also to define edge faces 42, 42 opposite side edges of bar 10 adapted to indicate the correct lines 15 to be read for rims gauged between the flat faces 26 and 37 on the fingers 22 and 33. For minimizing the amount of play between gauging member 27a and bar 10 a longitudinally tapered extension 41 on the gauging member has a flat underside which is slidably engageable with the corresponding flat side of the bar.

For increasing the range of sliding adjustment of finger 33, the gauging member 27a is provided with a recess 27c adapted to receive the shoulder portion 35 of said finger.

In use of the gauge described above to determine the standard tire size corresponding to "rim width" A of a rim R (see Figure 6), while the rim remains mounted on a wheel, and without removing the tire or the rim, the gauge with the longitudinally fixed finger 22 at the leading end thereof in the retracted position shown in full lines in Figures 1 to 4, is inserted flatwise through available space between the usual confining portions of a wheel W and the inner side of the base of the rim, and with said leading end of the bar 10 extended inwardly. The rim illustrated is a 6.05° which, as far as the corresponding tire size is concerned, is a Firestone Steel Products Company rim having a width A of six inches and a five degree taper at the bead seating portions.

With the bar 10 thus inserted, and the two part gauging head retracted to the opposite or trailing end thereof, the operator grips handle 20 to turn the rod 18 until the finger 22 is at right angles to the plane of the bar, and then by feel he engages the inner flat side 26 of the tip 25 firmly against the innermost edge portion of the gutter flange G of the rim base. Next, he moves the two parts of head 27 inwardly together until the flat face 37 of the tip 36 of correspondingly extended finger 33 engages the outer face of the opposite rim flange F, at which point the edges 42, 42 of the slide member 27, serving as an indexing means, will coincide with the indexing line reading "6.OR.5°." According to standards of the National Wheel and Rim Association, this designates a "Firestone R-5° full advanced demountable rim." Thus, by a very simple operation the width A is quickly determinable for ordering the correct size of tire replacement for the rim. Other indicia on the bar corresponds to different types and sizes of rims of various manufacturers thereof. When the measurement has been determined, the rod 18 in most instances again may be turned to swing the finger 22 to retracted position to permit free withdrawal of the gauge from the wheel, without necessarily disturbing either of the parts 27a and 27b of head 27. As best illustrated in Figure 5, the offset construction of the fingers 22 and 33 permits engagement of the fingers 22 and 33 over protruding portions of rims which might otherwise prevent accurate gauging operations.

Figure 11 illustrates use of the improved gauge in connection with a dual wheel under a condition in which heretofore it has been utterly impossible to gauge the inner wheel rim without removing the rims from the wheel assembly. In this type of situation the operator inserts the gauge flatwise between the brake drum and the inner rim base, substantially in the manner previously described, but first inserting the tip 36 of finger 33 between the gutter flange of the inner rim and the rim spacer, as shown, and then while holding the gauging member 27a relatively fixed at this point, sliding the bar 10 inwardly through the member 27a to a position in which the finger 22 may be pivoted to an angle at which it is engageable with the rim flange oppositely to said gutter flange. When these opposite points have been firmly engaged by the opposing fingers 22 and 33 the indexing member 27b is moved along the bar to position of mating engagement with the gauging member 27a, in which position the indexing member 27b is affixed to the bar 10 by turning the set screw 31 against the same. Now that the indexing member is fixed the finger 22 is pivoted back to flatwise relation to bar 10, and no further attention need be paid to the position of the gauging member 27a. Where space B is as slight as ⅜ inch, the cramped condition of bar 10 between the rim base and the brake drum may prevent requisite tilting of the bar to remove the tip 36 of finger 33 from between the rim gutter flange and the rim spacer. Because the indexing member 27b is affixed or locked on bar 10, however, the bar may be slidably moved with respect to member 27a in direction toward the operator, who then may easily manipulate the bar for outward removal of the same for the purpose of reading the correct rim size indicated by the edges 42 on the lines 15 of the bar.

Referring to the modified form of the invention shown in Figures 7 to 10, the numeral 45 indicates a rigid elongated bar of generally cylindrical metal rod formed with parallel opposite flat portions 46 and 47. The opposite ends of the bar 45 are outturned to provide a right angularly extending handle 48 and a gauging finger 49, respectively, both of which are integral with the bar. The finger 49 extends at right angles to the bar 45 and terminates in a freely extending reversely bent portion 50 defining a shoulder 51 laterally outwardly offset from the bar, as shown in Figure 8, and a relatively short gauging tip portion 52 which is longitudinally inwardly offset with respect to the corresponding end of the bar. A flat inner face 53 of the tip 52 is in a plane normal to the longitudinal axis of the bar.

Rotatably and longitudinally slidably received on the bar 45 is a cylindrical gauging head 55, which may be in two longitudinally separable parts, including a gauging member 56 and an indexing member 65. The gauging member 56 is shown provided with an integral narrow gauging finger 57 extending laterally outwardly of the rod 45, and terminating in a reversely bent portion 58 defining a shoulder 58a outwardly offset with respect to the bar and a relatively short gauging tip 59 longitudinally offset in direction toward the finger 49. That is, the fingers 49 and 57 are adapted to be longitudinally oppositely disposed, as best shown in Figure 8. The inner face 60 of tip 59 is flat and in parallelism to the face 53 of tip 52. Also integral with the member 55 may be a relatively short gauging finger 61, extending radially of the rod 45 at right angles to gauging finger 57. This gauging finger is relatively short in the sense that the offset shoulder 62 of the same is substantially closely spaced with respect to the bar 45 (see Figure 7) for gauging certain types of rims. Each gauging finger 49, 57 and 61 is of approximately the same width as the bar 45, and is tapered to a sharp knife-like edge for scraping clean the rim surface portion to be engaged by the finger during a rim gauging operation.

The indexing member 65 has a flat inner end 66 engageable in accurate mating relation to a flat face 67 of member 56, the other end of the indexing element having short extensions 68, 68 adapted to lie at opposite round sides of the bar. Flat longitudinally outward ends 69, 69 of the extensions 68 are positioned with respect to the gauging member 45 when in close contacting relation thereto whereby gauging marks 70, 70 on corresponding oppositely curved sides of the bar indicated by ends 69 will by means of code letters 71 or other symbols provide readings for rims gauged between oppositely disposed gauging faces 60 and 53 or 61 and 53. For fixing the indexing element 65 in any position of gauging adjustment, a set screw 72 is adapted to be turned against a flat side 46 or 47 of the bar, as shown in Figures 8 and 10.

The operation of the gauge shown in Figures 7 to 10 is substantially as shown and described in connection with Figures 1 to 6, and as particularly illustrated in operating condition in Figure 6. When the measurement has been made and the operator has fixed the gauging position of indexing element 65 on bar 45 by means of set screw 72, he may ignore the position of gauging member 55, which may then be turned or longitudinally adjusted as necessary for ready removal of the gauge from the wheel W (Figure 6), without disturbing the fixed position of element 65. This construction is particularly useful, for instance, in gauging the inside rims of dual wheels on trucks. The readings A, B, C, D, E, etc., indicated at 71 in Figure 8, may correspond to similar readings on a suitable chart (not shown) on which rim sizes are listed together with proper tire sizes for use with the same.

Other modifications of the invention may be resorted to without departing from the spirit thereof or the scope of the appended claims.

What is claimed is:

1. A device for gauging widths of automotive vehicle wheel rims, comprising an elongated bar having on at least one face thereof longitudinally spaced indicia corresponding to given widths of various wheel rims, a finger on one end of said bar extending laterally at an angle thereto and terminating in a rim-engaging tip, a member longitudinally slidably adjustable along said bar, said member having at least one finger thereon to provide a rim-engaging tip adapted to be in longitudinally spaced relation to said rim-engaging tip of said end finger, an element selectively independently slidable longitudinally of said bar on the side of said member toward the other end of the bar, said member and element having inwardly engageable mating portions, and indexing means on said bar and said element for indicating various longitudinally adjusted positions of said member and element corresponding to the spacing between said rim-engaging tips set while said mating portions are engaged, releasable means being provided for affixing said element on said bar in said various longitudinally adjusted positions whereby the adjusted position of said member may be released, whereby said member is freely relatively slidable along the portion of the bar intermediate the element and said one end of the bar without disturbing the affixed positions of said element.

2. A device for gauging widths of automobile vehicle wheel rims, comprising an elongated bar having on at least one face thereof longitudinally spaced indicia corresponding to given widths of various wheel rims, a finger on one end of said bar extending laterally at an angle thereto and terminating in a rim-engaging tip, a member longitudinally slidably adjustable along said bar, said member having at least one finger thereon to provide a rim-engaging tip adapted to be in longitudinally spaced relation to said rim-engaging tip of said end finger, said member being relatively rotatable on said bar in variously adjusted positions along the same, an element selectively independently slidable longitudinally of said bar on the side of said member toward the other end of bar, said member and element having inwardly engageable mating portions, and indexing means on said bar and said element for indicating various longitudinally adjusted positions of said member and element corresponding to the spacing between said rim-engaging tips set while said mating portions are engaged, releasable means being provided for affixing said element on said bar in said various longitudinally adjusted positions whereby said member is freely relatively slidable along the portion of the bar intermediate the element and said one end of the bar without disturbing the affixed positions of said element, said bar having a handle at the end thereof opposite to said end finger.

3. A device for gauging widths of automotive vehicle wheel rims, comprising an elongated, relatively thin flat bar having on at least one flat face thereof spaced indicia corresponding to given widths of various wheel rims, said bar having an opening along the length thereof closely adjacent an edge thereof, an elongated rod rotatably received through said opening, said rod having at one end of the bar a gauging finger of relatively narrow width not substantially exceeding the thickness of the bar, means on said rod adjacent the other end of the bar for rotating the rod to swing said finger thereon from a retracted position in which it is superimposed with respect to said one end of the bar to a freely extended gauging position at an angle to the general plane of the bar for engagement of the finger with one side portion of a rim, a member slidable along said bar and having thereon a second finger adapted to extend in the same direction as the freely extended first-named finger for engagement with an opposite side portion on the rim, and indicator means on said member for indicating on said indicia the corresponding width of a rim so engaged at opposite side portions by said fingers, said member including longitudinally separable first and second parts having inwardly engaging mating portions, said first part carrying said second finger, said second part having releasable means thereon for affixing the same to said bar in various positions of adjustment thereof, said first and second parts being independently freely slidable on the bar, whereby said first part is freely slidable along the portion of the bar intermediate said second part and the first-named finger without disturbing the affixed positions of said second part.

4. A device for gauging widths of automotive vehicle wheel rims, comprising an elongated, relatively thin flat bar having on at least one flat face thereof spaced indicia corresponding to given widths of various wheel rims, said bar having an opening along the length thereof closely adjacent an edge thereof, an elongated rod rotatably received through said opening, said rod having at one end of the bar a gauging finger of relatively narrow width not substantially exceeding the thickness of the bar, means on said rod adjacent the other end of the bar for rotating the rod to swing said finger thereon from a retracted position in which it is superimposed with respect to said one end of the bar to a freely extended gauging position at an angle to the general plane of the bar for engagement of the finger with one side portion of a rim, a member slidable along said bar and having thereon a second finger adapted to extend in the same direction as the freely extended first-named finger for engagement with an opposite side portion on the rim, and indicator means on said member for indicating on said indicia the corresponding width of a rim so engaged at opposite side portions by said fingers, said member including longitudinally separable first and second parts having inwardly engaging mating portions, said first part carrying said second finger, said second part having releasable means thereon for affixing the same to said bar in various positions of adjustment thereof, said first and second parts being independently freely slidable on the bar, whereby said first part is freely slidable along the portion of the bar intermediate said second part and the first-named finger without disturbing the affixed positions of said second part, said second finger being slidably mounted on said first part to be slidable in direction normal to the plane of said bar.

References Cited in the file of this patent

UNITED STATES PATENTS

| | | |
|---|---|---|
| 7,173 | Marquart | Mar. 12, 1850 |
| 85,430 | Burrows | Dec. 29, 1868 |
| 514,685 | Reber | Feb. 13, 1894 |
| 1,110,879 | Brown | Sept. 15, 1914 |
| 1,245,213 | Gammeter | Nov. 6, 1917 |
| 2,293,411 | Spillman | Aug. 18, 1942 |
| 2,311,234 | Krajnc | Feb. 16, 1943 |
| 2,311,323 | Addis | Feb. 16, 1943 |
| 2,563,440 | Wilson | Aug. 7, 1951 |

FOREIGN PATENTS

| | | |
|---|---|---|
| 201,195 | Canada | June 22, 1920 |